United States Patent Office 3,149,609
Patented Sept. 22, 1964

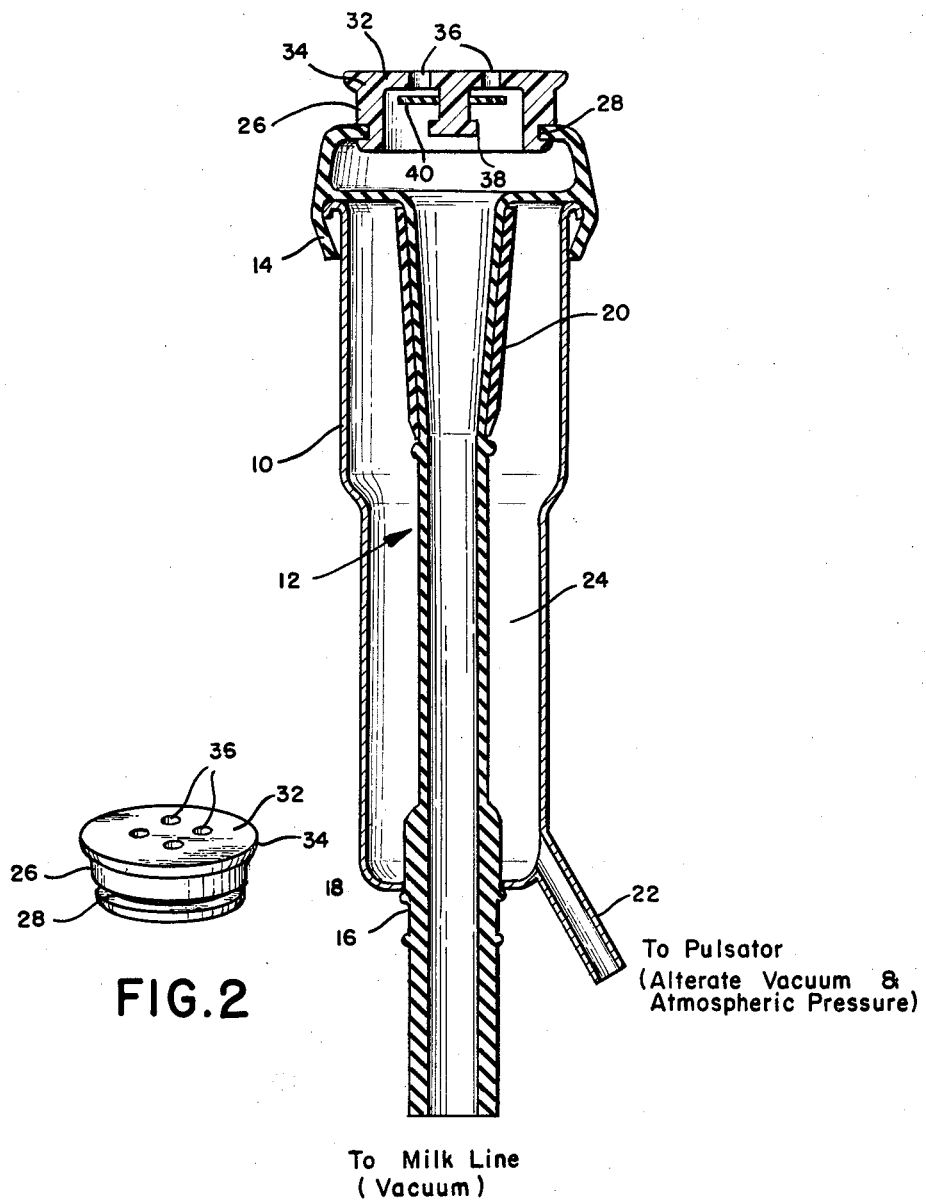

3,149,609
TEAT CUP WASHING ASSEMBLY AND
CHECK VALVE THEREFOR
Daniel O. Noorlander, Madison, Wis., assignor to Dairy Equipment Company, Madison, Wis., a corporation of Wisconsin
Filed Feb. 12, 1963, Ser. No. 257,932
5 Claims. (Cl. 119—14.18)

This invention relates to means for washing milking machine teat cup inflations. The inflations (the flexible liners in teat cups) have usually been scrubbed with a stiff brush after use. This required the removal of the inflation, the brushing broke the smooth neoprene surface (the more you clean it the more it needs cleaning), and then the parts had to be re-assembled. Throughout the dairy industry there has been interest in "cleaning in place" which avoids tear down of the parts.

The principal object of this invention is to provide simple apparatus allowing the inflation to be cleaned in place. This has been accomplished by providing a simple check valve device which is inserted into the assembled teat cup. When the cup is submerged in cleaning solution, and the milking system operated, the solution is pumped through the inflation, into the milk lines, etc. to flush the entire system. The inflations are cleaned better since they are flexed during washing.

Other objects and advantages will be pointed out in, or be apparent from, the specification and claims, as will obvious modifications of the single embodiment shown in the drawings, in which:

FIG. 1 is a vertical section through a teat cup in which the check valve device is mounted; and FIG. 2 is a perspective of the check valve device.

In the drawings the usual shell 10 is shown with the inflation 12 mounted for normal use. Thus, the upper end of the inflation has been pulled into the shell with the outer resilient skirt 14 pulled over the upper rolled edge of the shell to seat the inflation at that point. As usual, the inflation is then stretched through the lower opening of the shell to pull the annular shoulder 16 past the orifice so that the orifice lies between the shoulder 16 and the other shoulder 18. The inflation is fabricated of neoprene and may be provided with a rubber sleeve 20 at the upper portion to provide the desired resilience without subjecting the rubber to contact with butterfat which is highly deleterious to the rubber. The lower end of the inflation is adapted for connection to the milk line, usually through a claw or milking bucket or the like. The shell is provided with a connector 22 which is adapted for connection to the pulsator to subject the space 24 between the inflation and the shell to alternate vacuum and atmospheric pressure. As is well known, when the space 24 is placed under vacuum the inflation will expand so that it opens up to place the interior of the inflation under the vacuum in the milk line. This is the milking phase. When the pulsator now connects the space 24 to atmospheric pressure the pressure will collapse the liner or inflation. This is known as the rest phase in the milking process.

When it is desired to clean the inflation the past practice has required removal of the inflation from the shell and the inflation was then generally scrubbed by means of a stiff brush which was not only time consuming but had the effect of breaking down the smooth surfaces of the inflation which, in turn, greatly shortened the useful life of the inflation since it was then subject to more ready contamination. To eliminate this type of washing and permit the inflation to be washed without removal from the cup I provide the check valve device shown in FIG. 2. This is a molded rubber or neoprene part having a depending skirt portion 26 which is provided with an annular groove 28 which is adapted for engagement with the upper opening 30 of the inflation as shown in FIG. 1. Since the diameter of the groove is somewhat greater than the diameter of the opening this will stretch the opening 30 and seal the opening at this point. The upper flat portion 32 of the device is provided with a peripheral rim 34 which facilitates removal of the device after it has been used. The upper surface is provided with four holes 36 and the underside of the flat surface 32 is provided with a central molded stud 38 on which a flexible rubber or neoprene check valve 40 is mounted to cooperate with the holes 36.

If the assembled teat cup shown in FIG. 1 is now submerged in a cleaning solution and the pulsator places the space 24 under vacuum the inflation opens up and the vacuum in the milk line will draw the cleaning solution through the holes 36 past the check valve 40 and on through the inflation. When the pulsator now connects the space 24 to atmospheric pressure the inflation will be collapsed. This will relieve the vacuum under the check valve and the tendency to back flow will be prevented by the check valve. At the same time the collapsing action of the inflation will cause considerable turbulence within the inflation to thoroughly cleanse the interior surfaces.

Since the inflation is being flexed throughout the cleansing operation the cleansing is actually superior to that obtained by the old methods. Since there is no abrading action on the inflation the life of the inflation is considerably increased. Furthermore, by eliminating the need for removal of the inflation the possibility of damage to the inflation is greatly reduced. The structure, therefore, permits more rapid and thorough cleansing of the inflation while prolonging the life of the inflation.

Although but one embodiment of the present invention has been illustrated and described, it will be apparent to those skilled in the art that various changes and modifications may be made therein without departing from the spirit of the invention or from the scope of the appended claims.

I claim:

1. The combination with an assembled teat cup including an inflation therein, the inflation having an opening therein for reception of a teat, of a member mounted in the opening, an orifice in the member, and a check valve seating on the inside of the orifice and allowing flow only into the inflation through the orifice.

2. The combination with a teat cup having an inflation mounted therein, the inflation having an opening therein for reception of a teat, of a member sealingly mounted in the teat opening of the inflation, an orifice in the member to allow flow into the inflation, a check valve seating on the inside of the orifice to prevent flow therethrough from the inflation while allowing flow into the inflation.

3. The combination of claim 2 in which the member is provided with a peripheral groove having a diameter greater than the teat opening in the inflation.

4. The combination of claim 2 in which the check valve comprises a flexible member overlying the side of the orifice facing the inflation interior.

5. The combination according to claim 2 in which the member is provided with a plurality of orifices and has a central mounting stud facing the interior of the inflation, said check valve comprising a flexible member mounted on the stud and overlying said orifices.

References Cited in the file of this patent
UNITED STATES PATENTS

| 388,871 | Hoffman | Sept. 4, 1888 |
| 575,213 | Cook | Jan. 12, 1897 |

FOREIGN PATENTS

| 856,243 | Germany | Nov. 20, 1952 |